US007616260B2

(12) United States Patent
Kano et al.

(10) Patent No.: US 7,616,260 B2
(45) Date of Patent: Nov. 10, 2009

(54) ELECTRONIC APPARATUS EQUIPPED WITH A MICROPHONE

(75) Inventors: Shinichi Kano, Tokyo (JP); Tokusuke Tsujimoto, Tokyo (JP); Koichi Sadatsuki, Tokyo (JP)

(73) Assignee: Sony Corporation, Tokyo (JP)

( * ) Notice: Subject to any disclaimer, the term of this patent is extended or adjusted under 35 U.S.C. 154(b) by 810 days.

(21) Appl. No.: 11/248,126

(22) Filed: Oct. 13, 2005

(65) Prior Publication Data

US 2006/0109997 A1 May 25, 2006

(30) Foreign Application Priority Data

Oct. 14, 2004 (JP) .......................... P2004-300101

(51) Int. Cl.
*H04N 5/225* (2006.01)

(52) U.S. Cl. ...................................... 348/376; 348/374

(58) Field of Classification Search ................. 348/373, 348/375, 376, 374; 381/91, 355, 360, 26
See application file for complete search history.

(56) References Cited

U.S. PATENT DOCUMENTS 3,944,759 A * 3/1976 Penning ...................... 381/355
4,628,525 A * 12/1986 Iwahara et al. ................ 381/26
5,359,157 A * 10/1994 Liu ............................ 181/129
5,657,084 A * 8/1997 Kurokawa et al. .......... 348/373
6,148,089 A * 11/2000 Akino ........................ 381/355
6,507,659 B1 * 1/2003 Iredale et al. ................. 381/26
2006/0083389 A1 * 4/2006 Oxford et al. ................. 381/91
2006/0109996 A1 * 5/2006 Larson et al. ............... 381/365

FOREIGN PATENT DOCUMENTS

JP 2001-008282 1/2001
JP 2003-18543 1/2003

* cited by examiner

*Primary Examiner*—Jason Whipkey
(74) *Attorney, Agent, or Firm*—Finnegan, Henderson, Farabow, Garrett & Dunner, L.L.P.

(57) ABSTRACT

An electronic apparatus including: an enclosure constituting an outer case of the apparatus; a receiving recess, formed of a bottom wall and a side wall uprising from a circumference of the bottom wall, disposed on the enclosure as opened outward; a holding member, formed of a vibration relaxing material capable of relaxing vibrations, received in the receiving recess; a supporting piece for supporting the holding member within the receiving recess such that a space is secured between the holding member and the bottom wall; a recess for microphone formed on a face, facing outward, of the holding member as opened outward, in a condition of the holding member being supported by the supporting piece within the receiving recess; a microphone inserted into the recess for microphone; and a grill disposed to cover a side of the holding member facing outward, in a condition of the holding member being supported by the supporting piece within the receiving recess, the grill being provided with a plurality of through holes made in its portions facing the microphones.

9 Claims, 15 Drawing Sheets

ELECTRONIC APPARATUS EQUIPPED WITH A MICROPHONE

CROSS REFERENCES TO RELATED APPLICATIONS

The present invention contains subject matter related to Japanese Patent Application JP2004-300101 filed in the Japanese Patent Office on Oct. 14, 2004, the entire contents of which being incorporated herein by reference.

BACKGROUND OF THE INVENTION

1. Field of the Invention

The present invention relates to an electronic apparatus equipped with a microphone.

2. Description of Related Art

There are apparatuses such as image pickup apparatuses for recording on a storage medium a video signal obtained by taking an image of a photographic subject and an audio signal obtained from ambient sounds in the photographing environment.

As such an electronic apparatus, there is one that is equipped with a plurality of microphones for recording a multi-channel audio signal of a so-called stereophonic reproduction system (refer, for example, to Japanese Patent Laid-open Publication No. 2003-18543).

SUMMARY OF THE INVENTION

When microphones are installed on an electronic apparatus, the microphones are generally incorporated in an enclosure constituting the outer case of the electronic apparatus.

Meanwhile, within the electronic apparatus are contained motors, as well as their power transmission mechanisms, for driving recording media, i.e., an optical disk such as a CD and a DVD and a magneto optical disk such as an MD.

Therefore, it is feared that vibrations and noises generated from such motors and power transmission mechanisms are transmitted via the enclosure to the microphones and the noises are recorded on the recording media.

Thus, there arises a problem how to suppress the transmission to the microphones of the noises and vibrations occurring within the electronic apparatus.

The present invention addresses the above mentioned problem. Accordingly, there is provided an electronic apparatus capable of obtaining to advantage a good audio signal by suppressing the transmission of vibrations and noises to microphones.

In an embodiment of the present invention, there is provided an electronic apparatus equipped with microphones including an enclosure constituting an outer case of the electronic apparatus, a receiving recess, formed of a bottom wall and a side wall uprising from a circumference of the bottom wall, provided on the enclosure as opened outward, a holding member, formed of a vibration relaxing material capable of relaxing vibrations, received in the receiving recess, a supporting piece for supporting the holding member within the receiving recess such that a space is secured between the holding member and the bottom wall, a recess for microphone formed on a face, facing outward, of the holding member as opened outward, in a condition of the holding member being supported by the supporting piece within the receiving recess, a microphone inserted into the recess for microphone, and a grill disposed to cover the side of the holding member facing outward, in a condition of the holding member being supported by the supporting piece within the receiving recess, the grill being provided with a plurality of through holes made in its portions facing the microphone.

Therefore, according to an embodiment of the invention, noises generated within the enclosure are relaxed by virtue of the presence of the bottom wall and side wall constituting the receiving recess, the space, and the holding member. Thus, noises reaching the microphones are suppressed and an advantage in obtaining a good audio signal can be obtained.

Further, since there is provided the space between the holding member and the bottom wall, the vibration generated within the enclosure is prevented from being directly transmitted from the bottom wall to the holding member, or even if the vibration is transmitted from the bottom wall to the supporting piece, it is relaxed by the holding member. Accordingly, vibrations reaching the microphones can be suppressed and hence an advantage is provided in obtaining a good audio signal.

BRIEF DESCRIPTION OF THE DRAWINGS

Embodiments of the present invention will be described in detail based on the following figures, wherein.

DETAILED DESCRIPTION OF THE PREFERRED EMBODIMENTS

In order to reduce noises and vibrations transmitted to a microphone to thereby obtain a good audio signal, an embodiment of the present invention is adapted to have a receiving recess formed on an enclosure as opened outward, to have the microphone held by a holding member made of a vibration relaxation material, and to have the holding member supported by a supporting piece within the receiving recess, such that a space is secured between the holding member and the bottom wall of the receiving recess.

First Embodiment

A first embodiment of the present invention will be described below with reference to the accompanying drawings.

In the present embodiment, the description will be give as to a case where the electronic apparatus is an image pickup apparatus.

Figure 1:
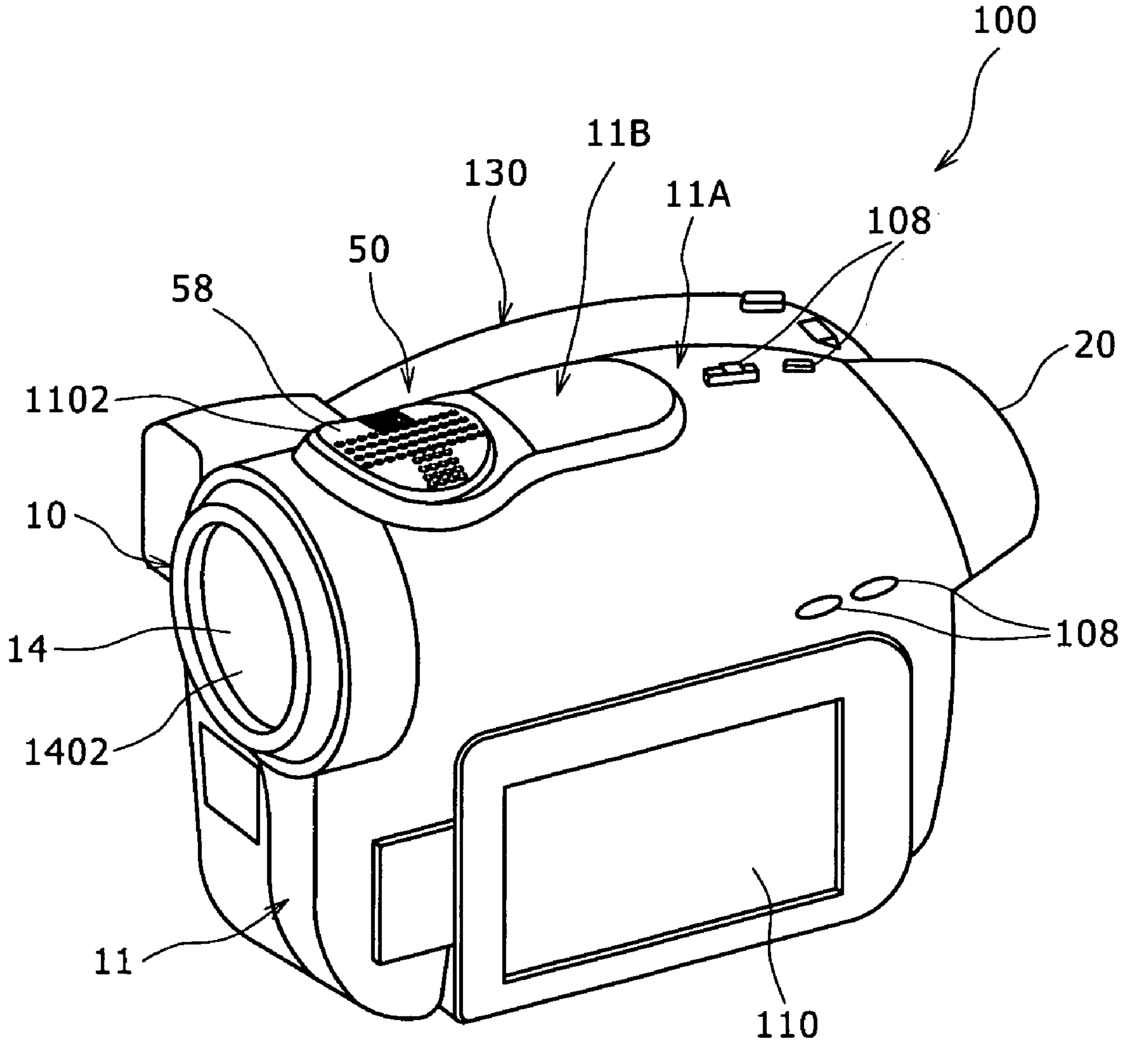
FIG. 1 is a perspective view of an image pickup apparatus.
Figure 2:
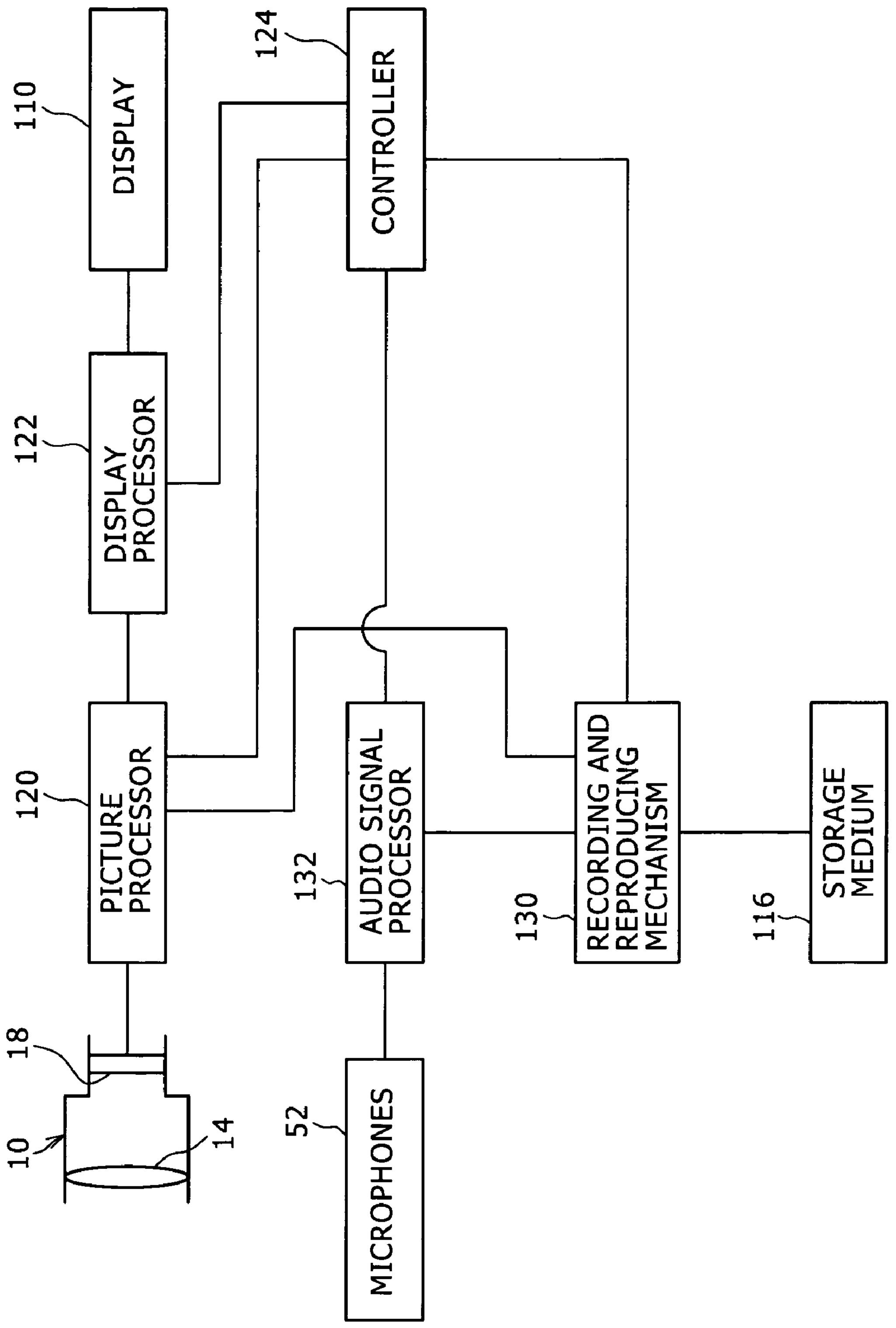
FIG. 2 is a block diagram of a control system of the image pickup apparatus.

FIG. 1 is a perspective view of the image pickup apparatus and FIG. 2 is a block diagram of a control system of the image pickup apparatus.

Figure 3:
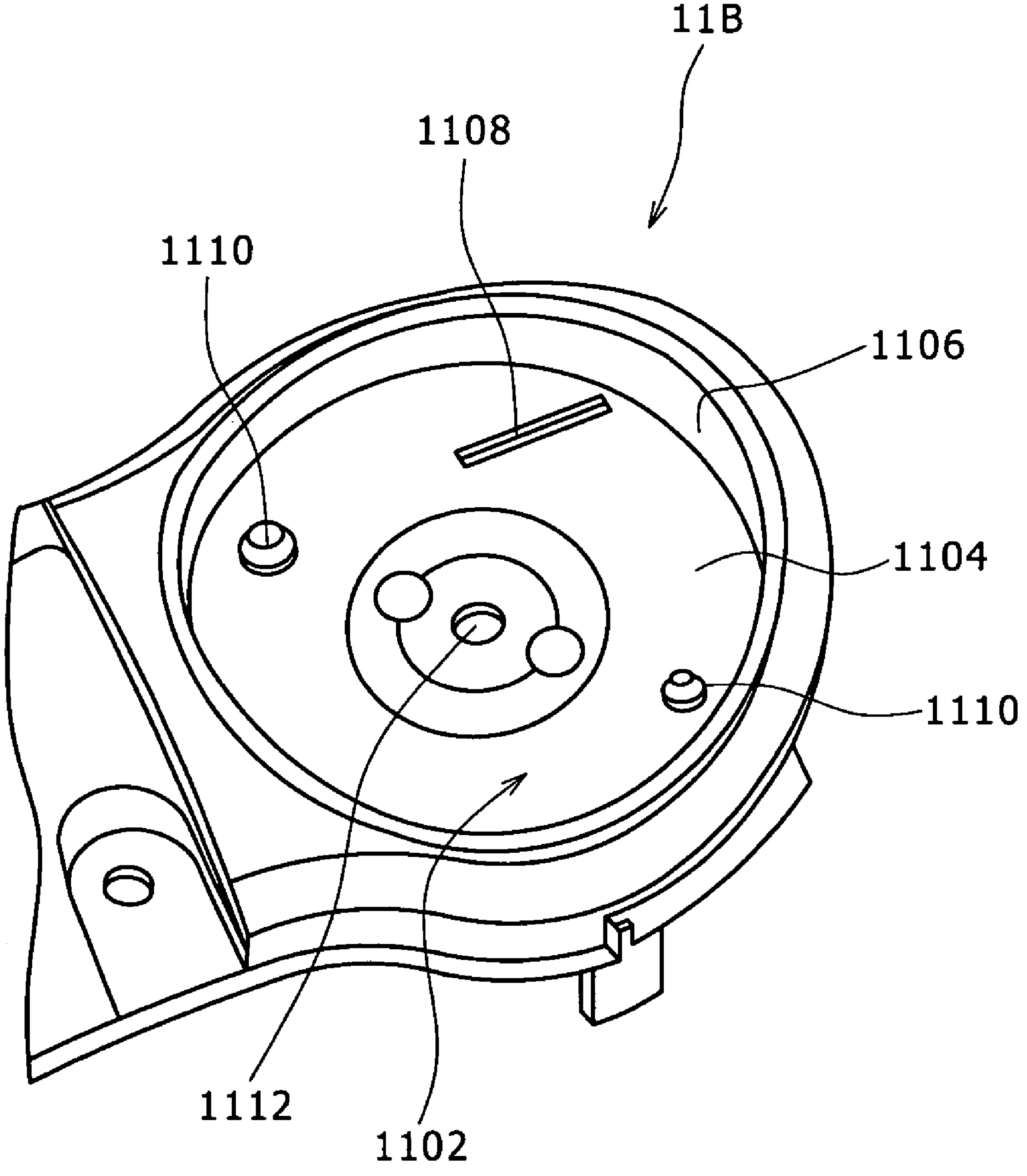
FIG. 3 is a perspective view of a recess on the image pickup apparatus.
Figure 4:
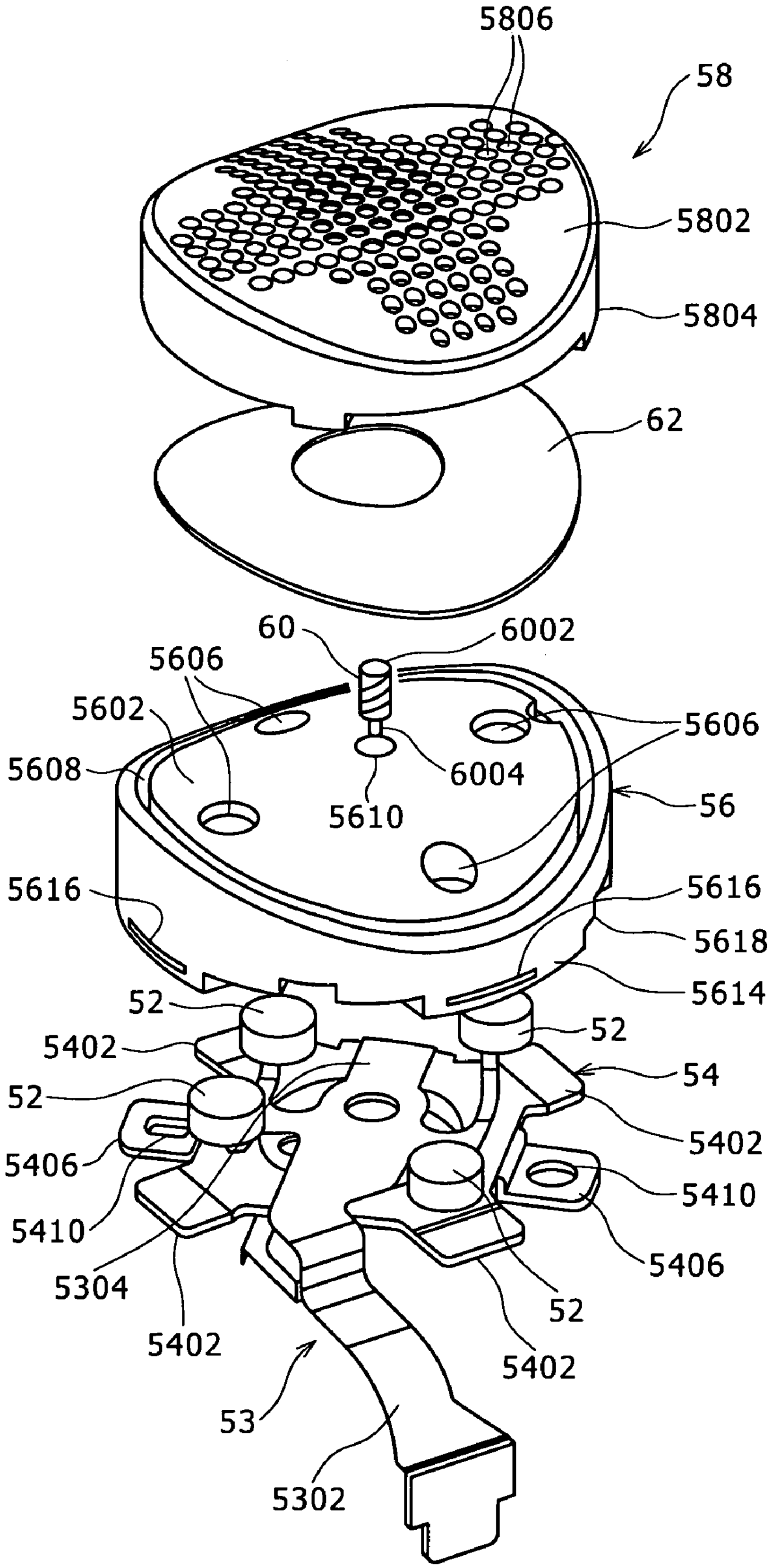
FIG. 4 is an exploded view in perspective of a microphone unit.
Figure 5A:
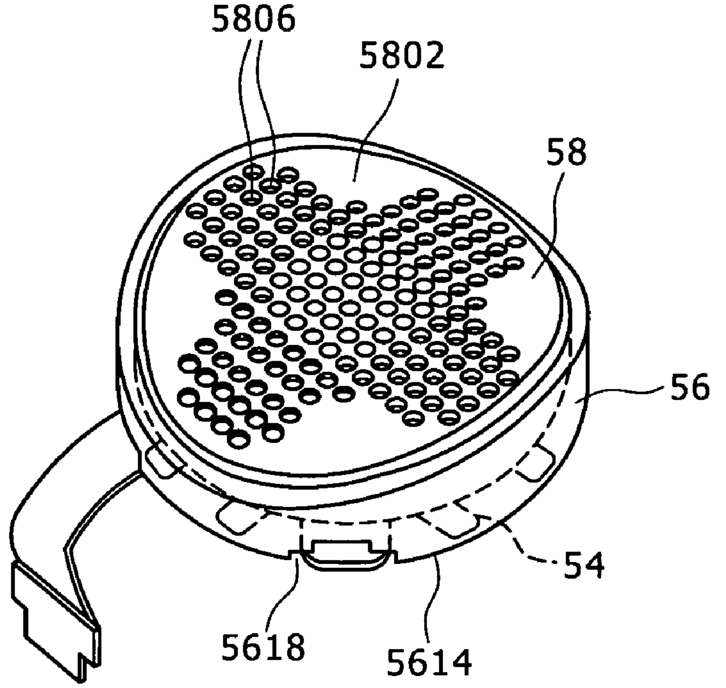
FIG. 5A is a perspective view of the microphone unit.
Figure 5B:
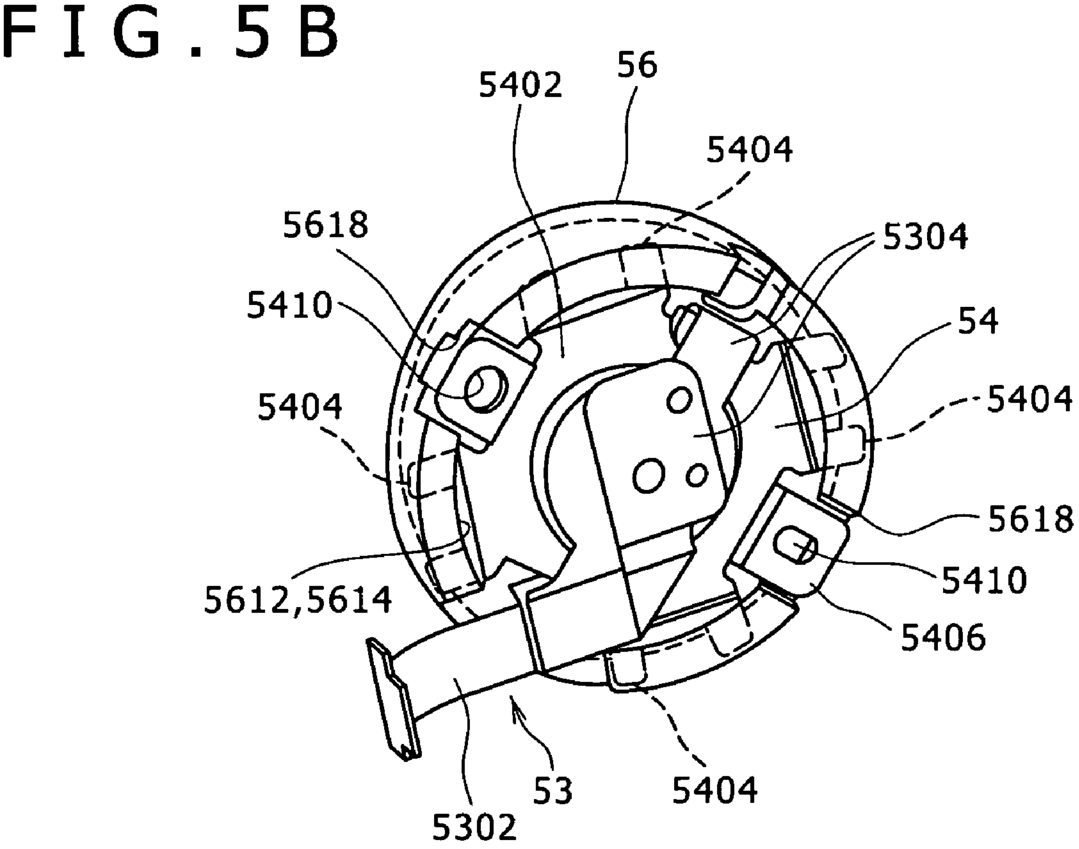
FIG. 5B is a perspective view of the microphone unit.
Figure 6A:
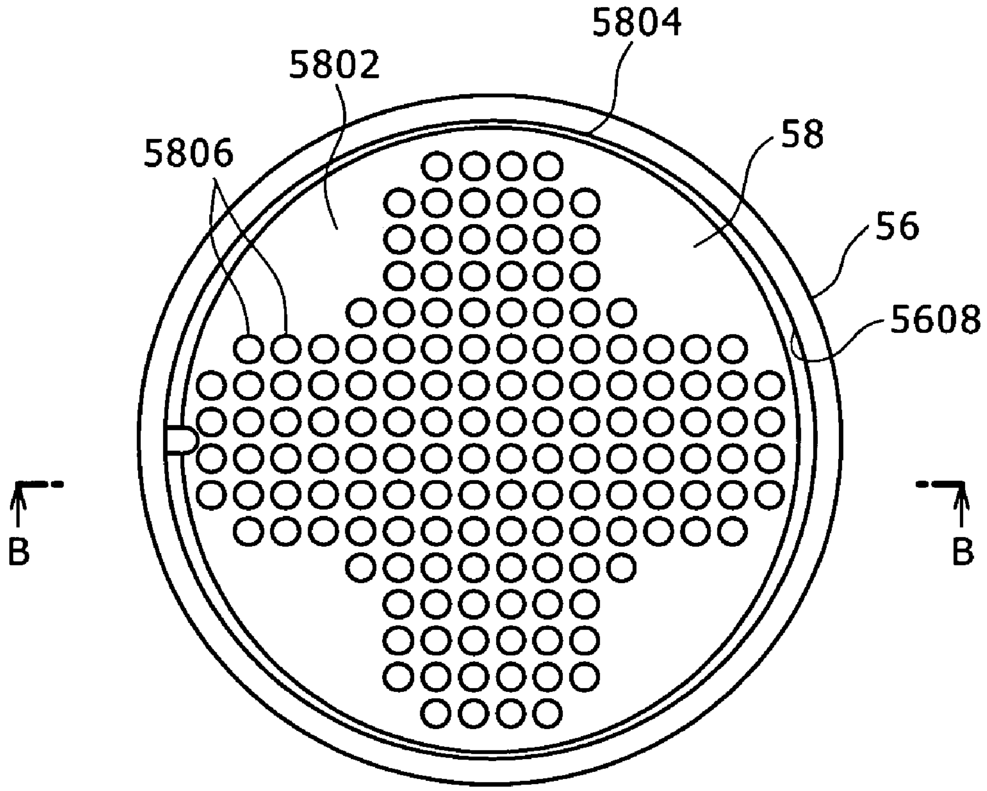
FIG. 6A is a plan view of the microphone unit.
Figure 6B:
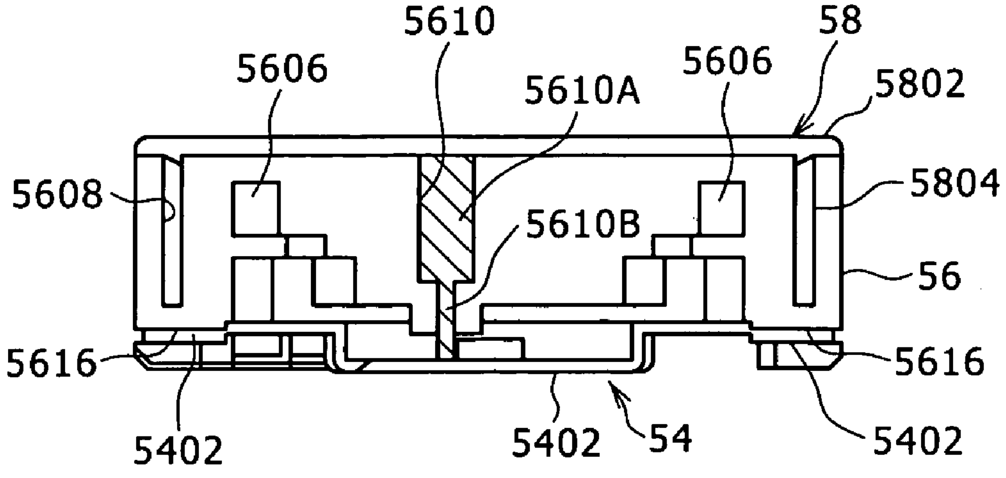
FIG. 6B is a sectional view taken along the line BB of FIG. 6A.
Figure 7A:
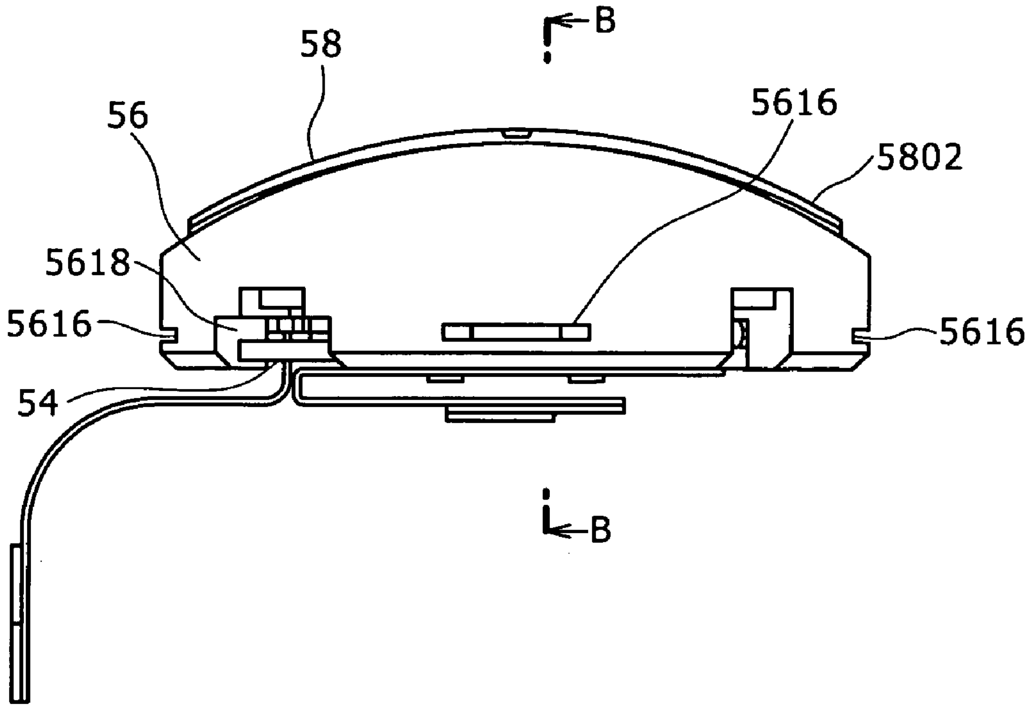
FIG. 7A is a side view of the microphone unit.
Figure 7B:
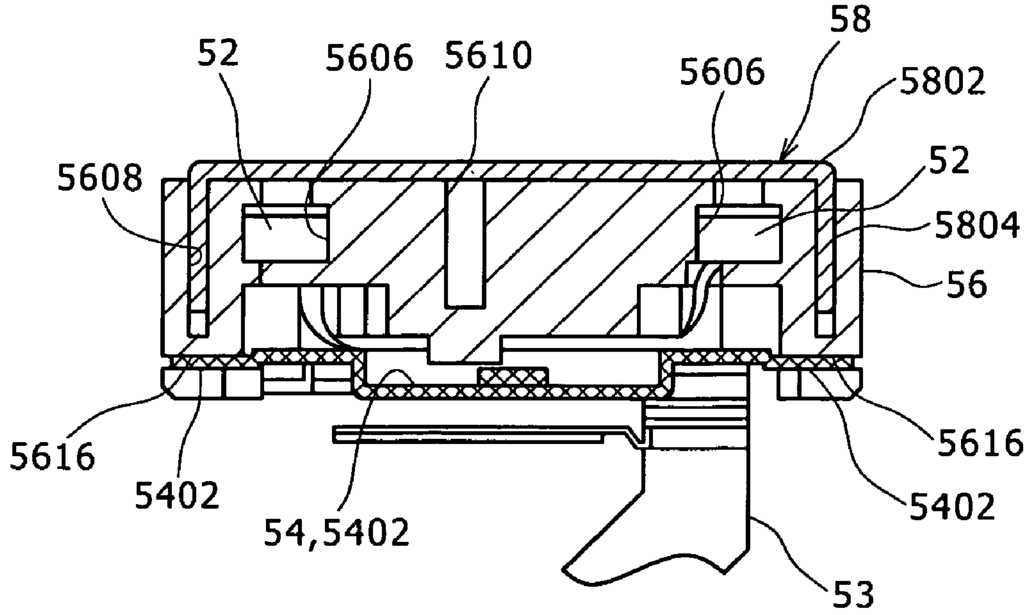
FIG. 7B is a sectional view taken along the line BB of FIG. 7A.

FIG. 3 is a perspective view of a depressed portion of the image pickup apparatus, FIG. 4 is an exploded view in perspective of a microphone unit, FIGS. 5A, 5B are perspective views of the microphone unit, FIG. 6A is a plan view of the microphone unit, FIG. 6B is a sectional view taken along the line BB of FIG. 6A, FIG. 7A is a side view of the microphone unit, and FIG. 7B is a sectional view taken along the line BB of FIG. 7A.

Figure 8:
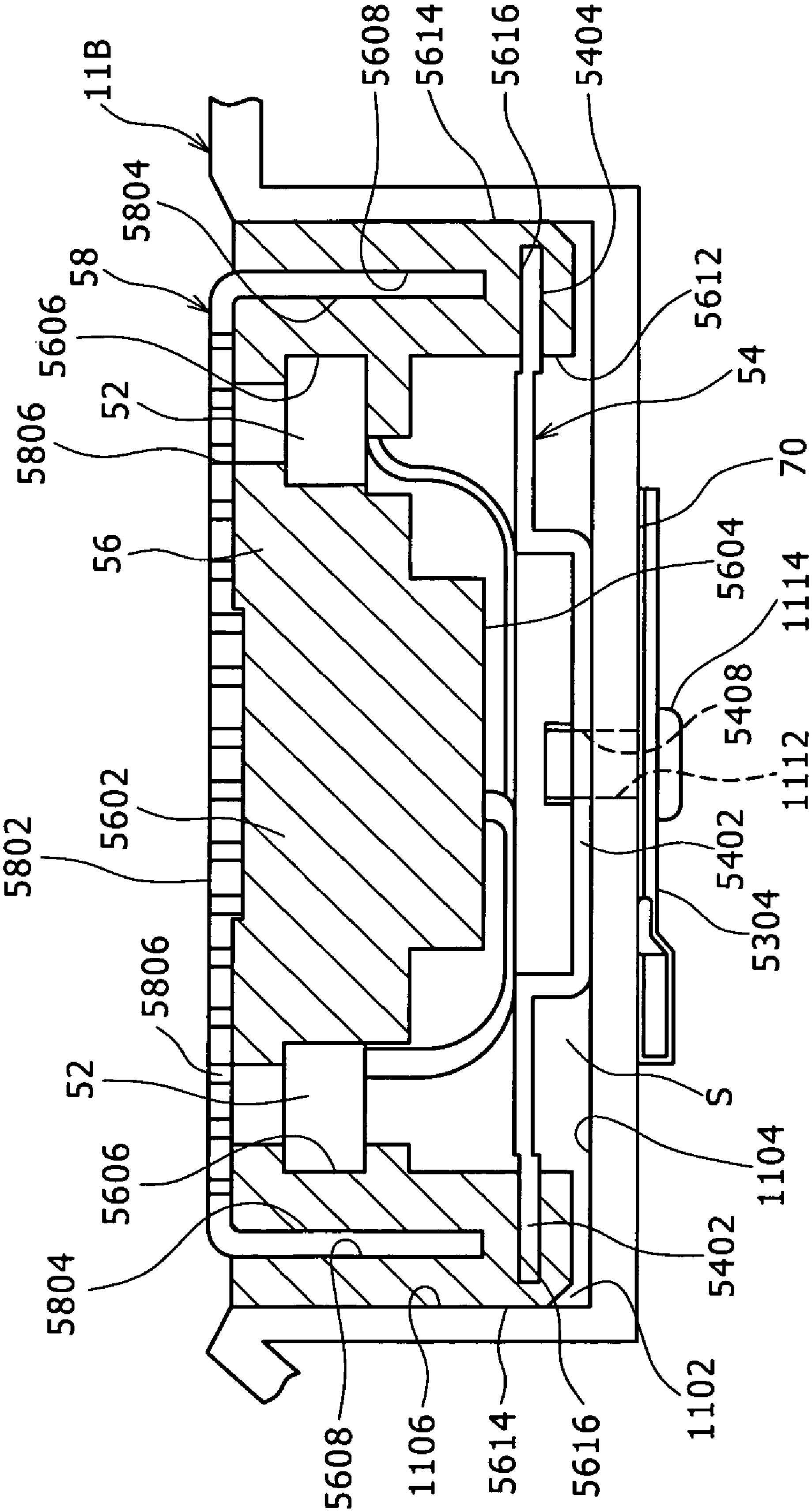
FIG. 8 is a sectional view of the microphone unit attached to an enclosure.

FIG. 8 is a sectional view of the microphone unit attached to an enclosure.

Figure 9:
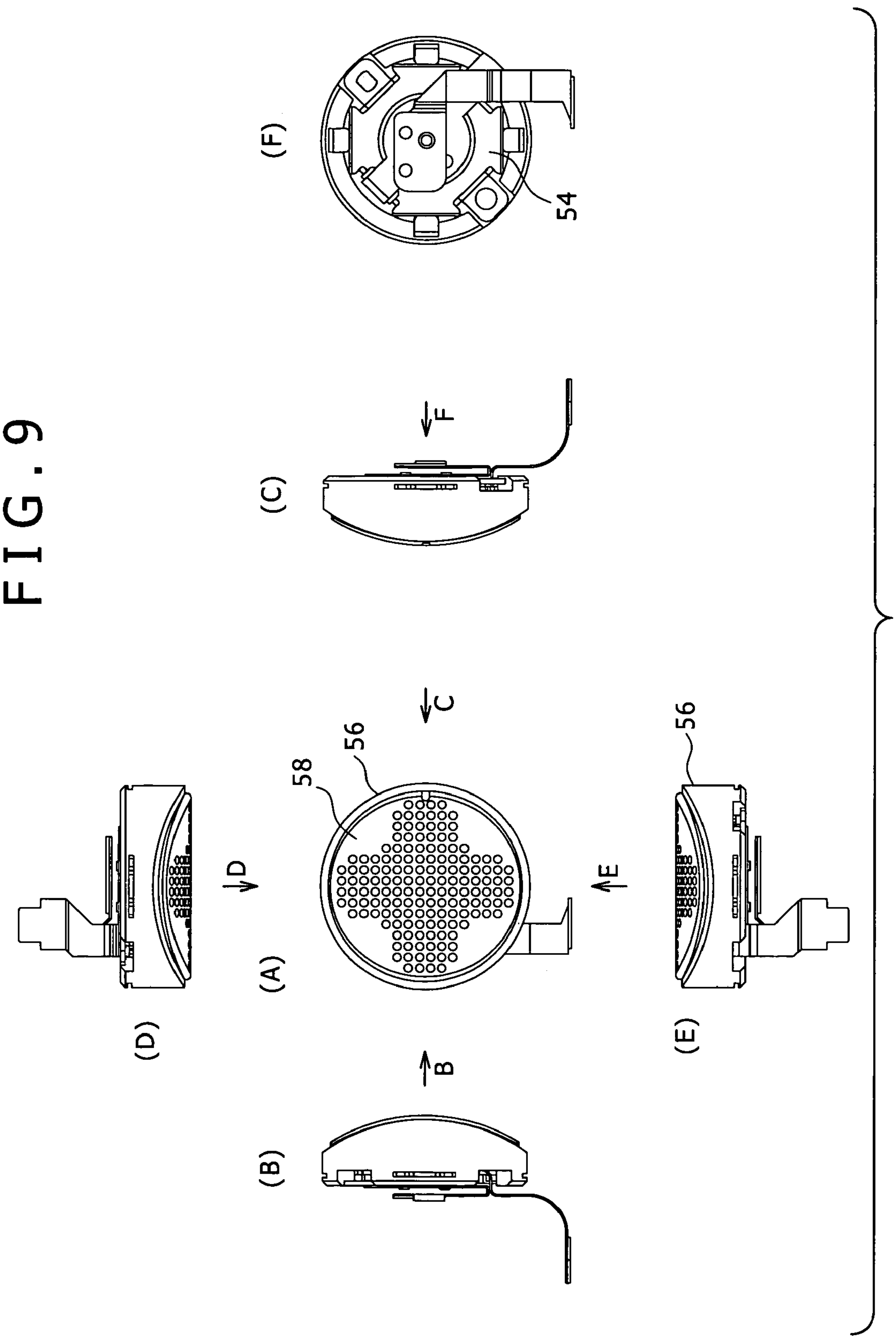
FIG. 9(A) is a plan view of the microphone unit.
FIG. 9(B) is a view in the direction of the arrow B of FIG. 9(A)
FIG. 9(C) is a view in the direction of the arrow C of FIG. 9(A)
FIG. 9(D) is a view in the direction of the arrow D of FIG. 9(A)
FIG. 9(E) is a view in the direction of the arrow E of FIG. 9(A)
FIG. 9(F) is a view in the direction of the arrow F of FIG. 9(C)

FIG. 9(A) is a plan view of the microphone unit, FIG. 9(B) is a view in the direction of the arrow B of FIG. 9(A), FIG. 9(C) is a view in the direction of the arrow C of FIG. 9(A), FIG. 9(D) is a view in the direction of the arrow D of FIG. 9(A), FIG. 9(E) is a view in the direction of the arrow E of FIG. 9(A), and FIG. 9(F) is a view in the direction of the arrow F of FIG. 9(C).

Figure 10:
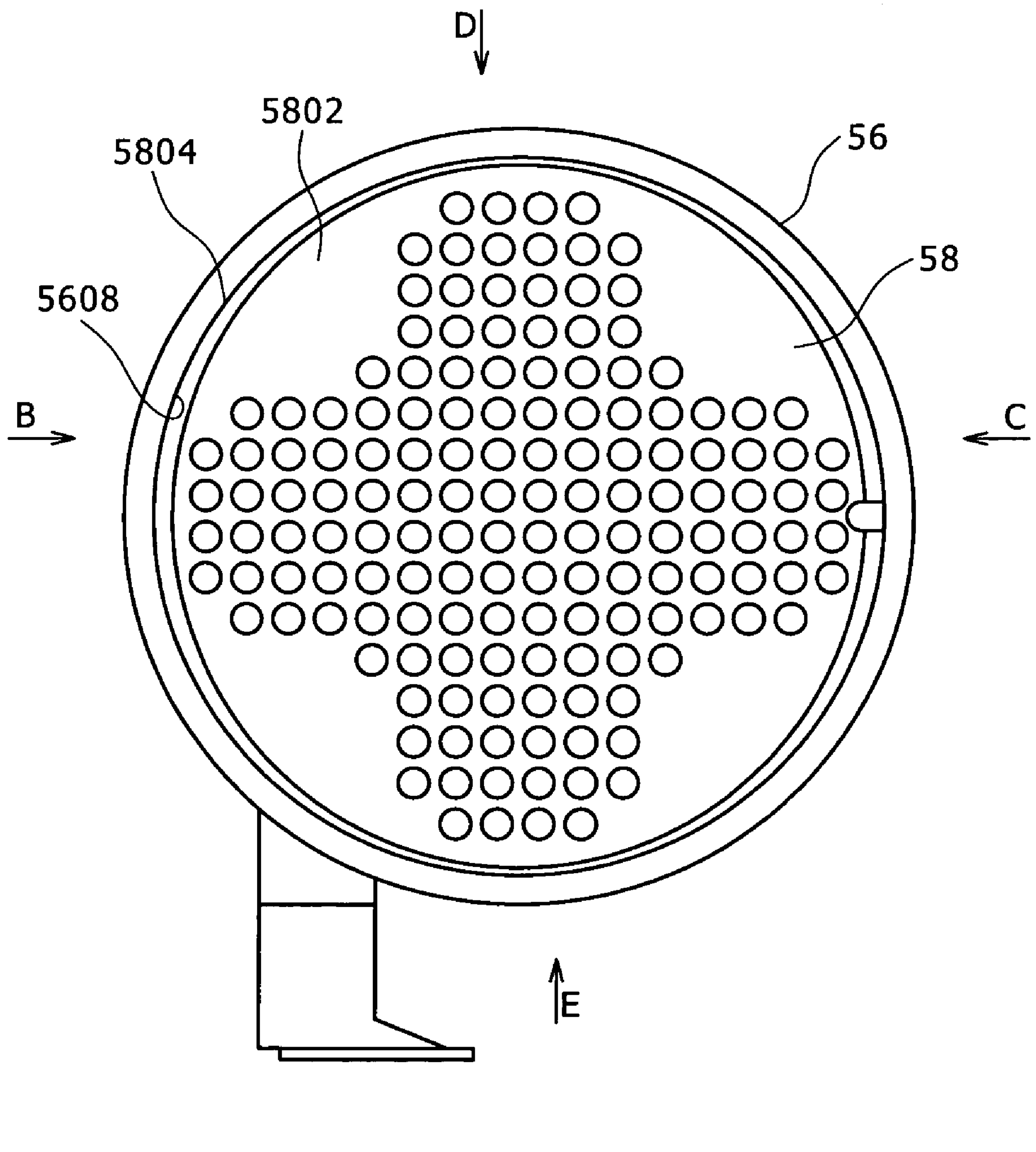
FIG. 10 is a plan view of the microphone unit.
Figure 11:
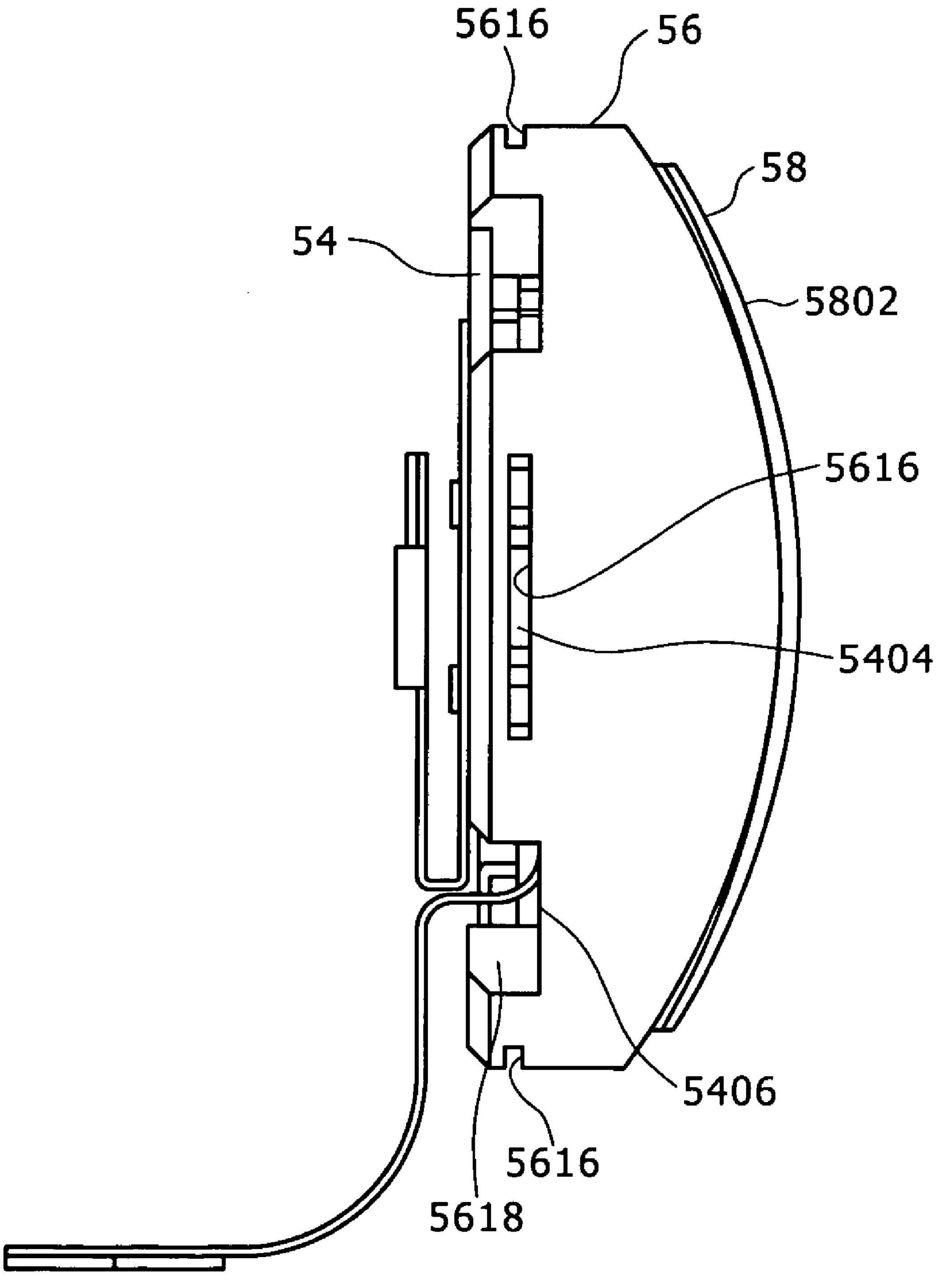
FIG. 11 is a view in the direction of the arrow B of FIG. 10.
Figure 12:
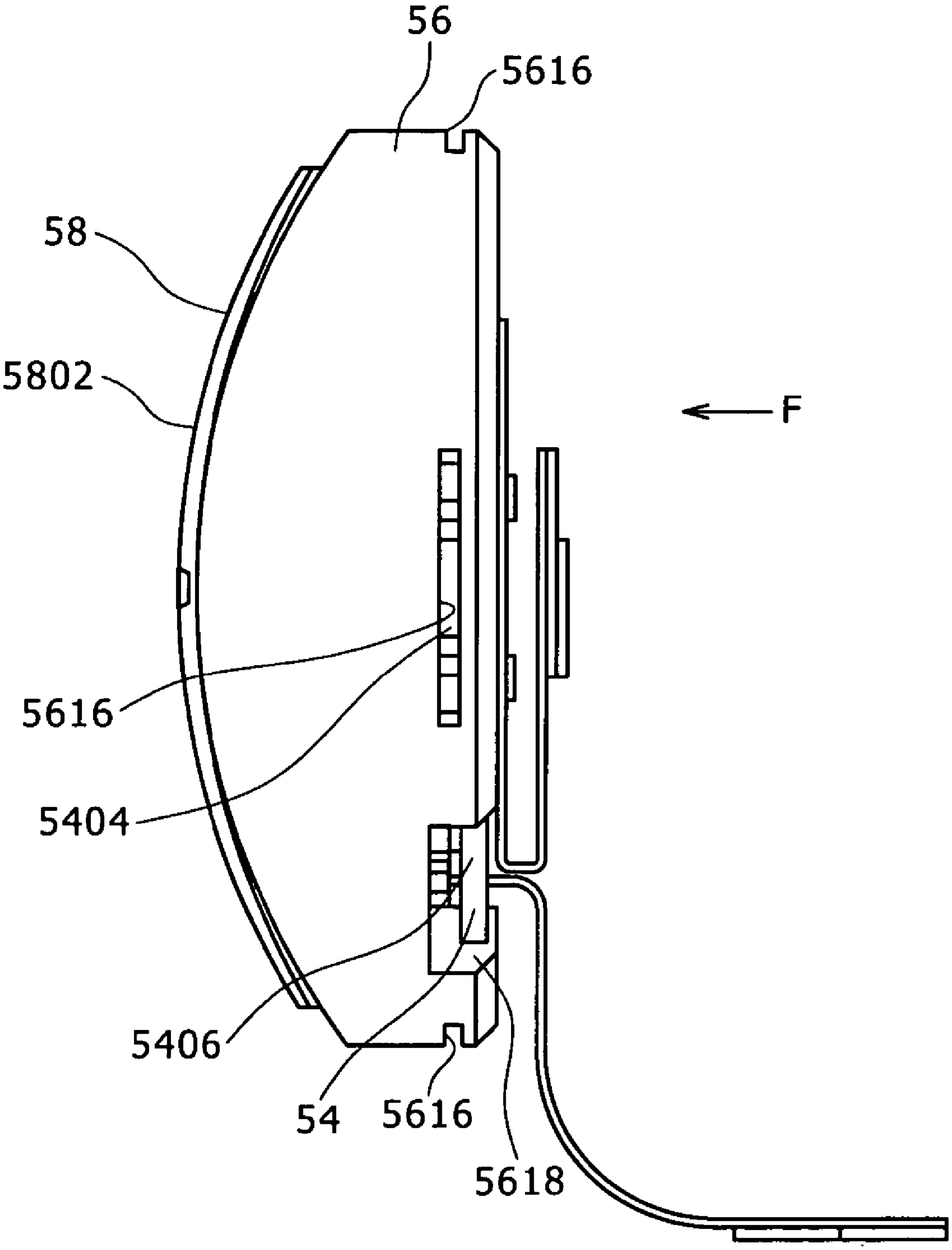
FIG. 12 is a view in the direction of the arrow C of FIG. 10.
Figure 13:
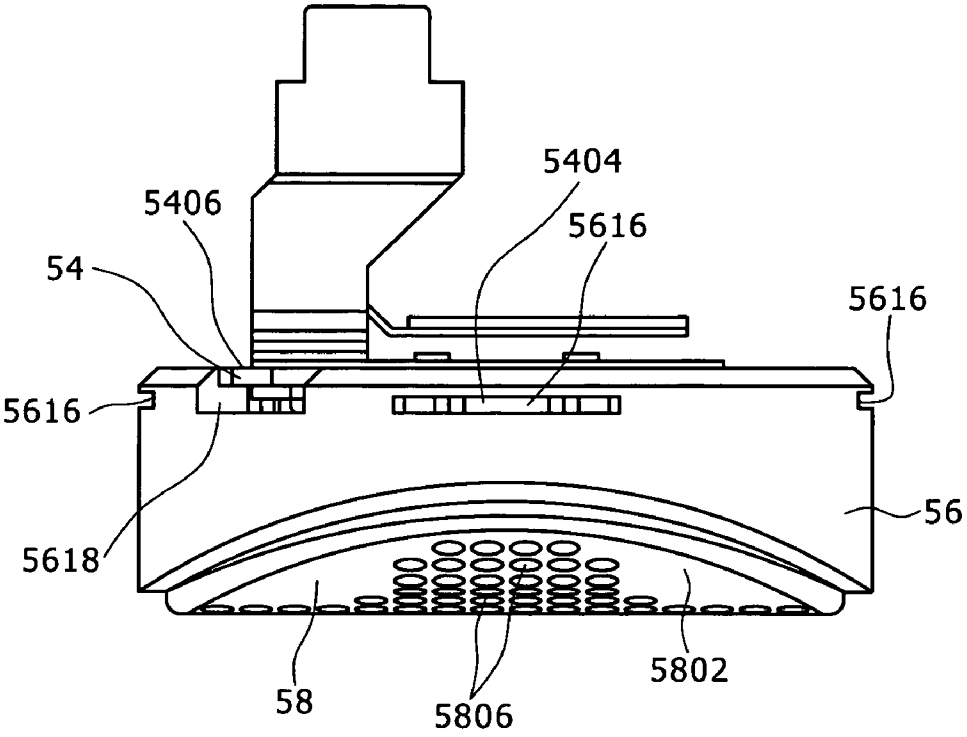
FIG. 13 is a view in the direction of the arrow D of FIG. 10.
Figure 14:
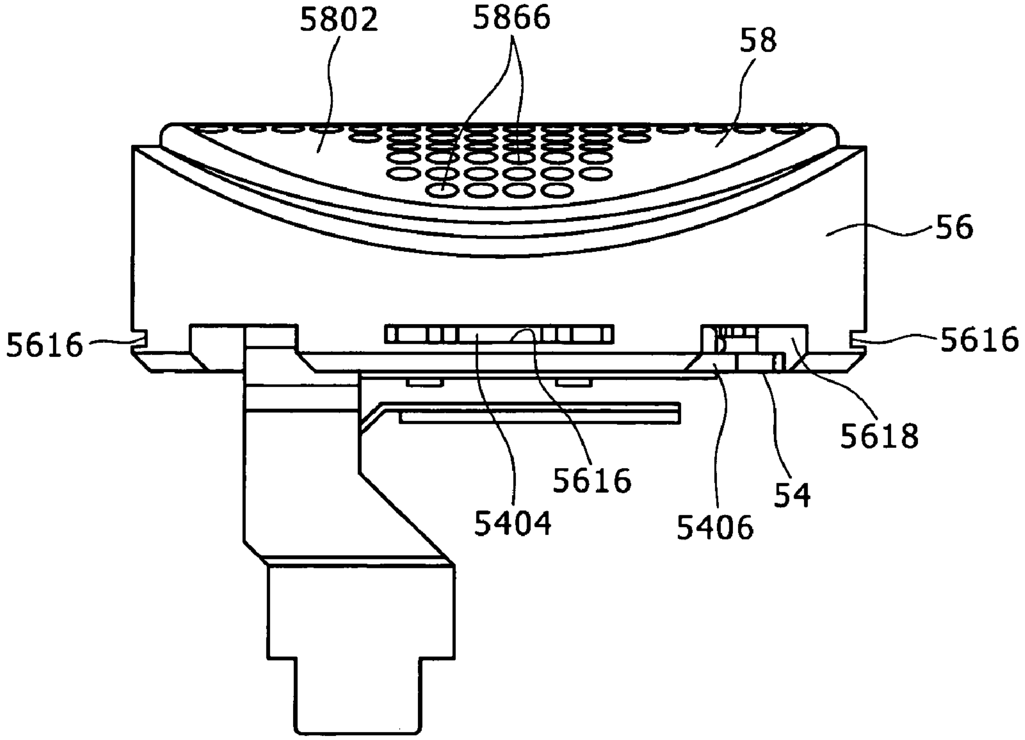
FIG. 14 is a view in the direction of the arrow E of FIG. 10.
Figure 15:
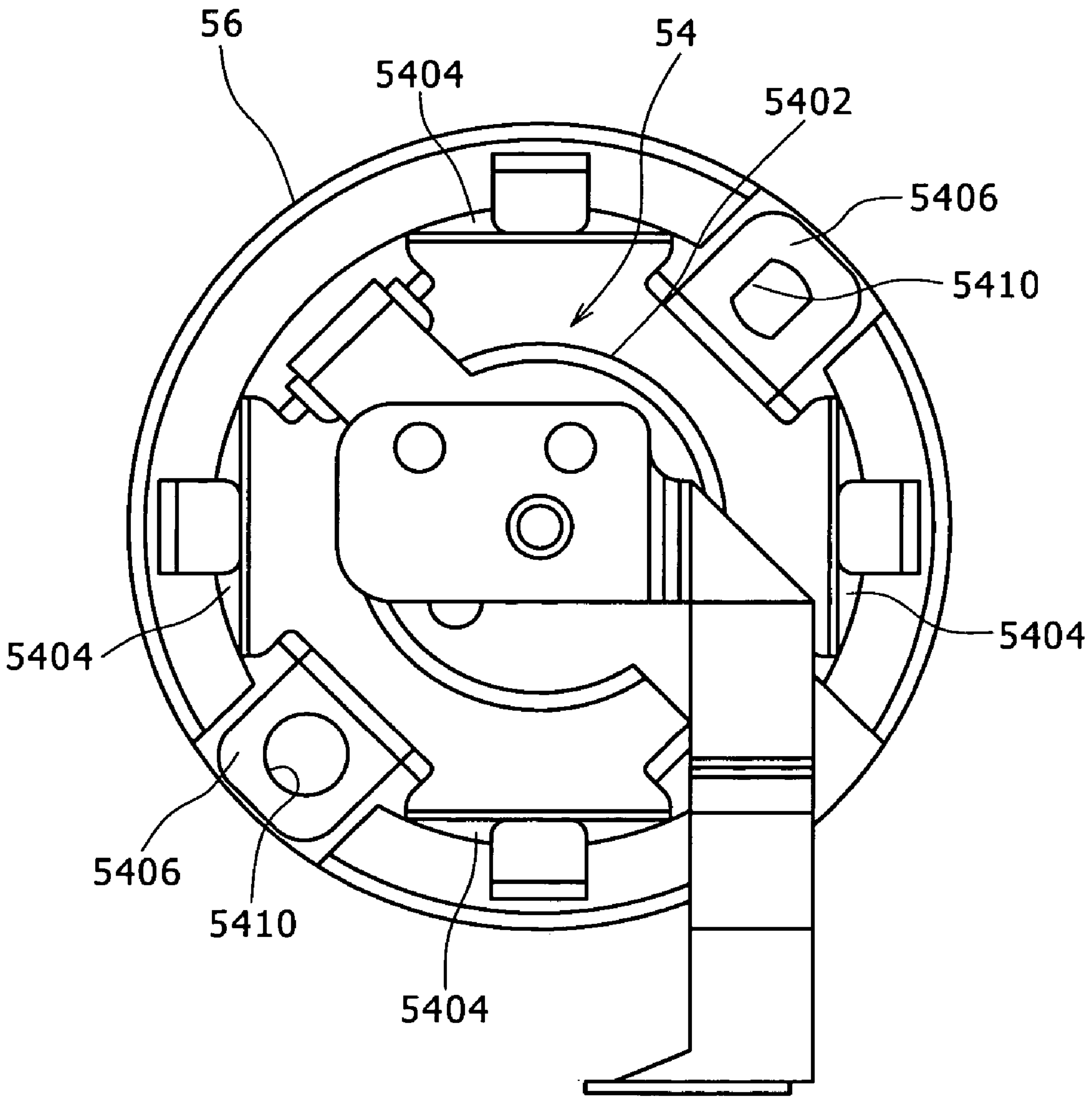
FIG. 15 is a view in the direction of the arrow F of FIG. 12.
Figure 16:
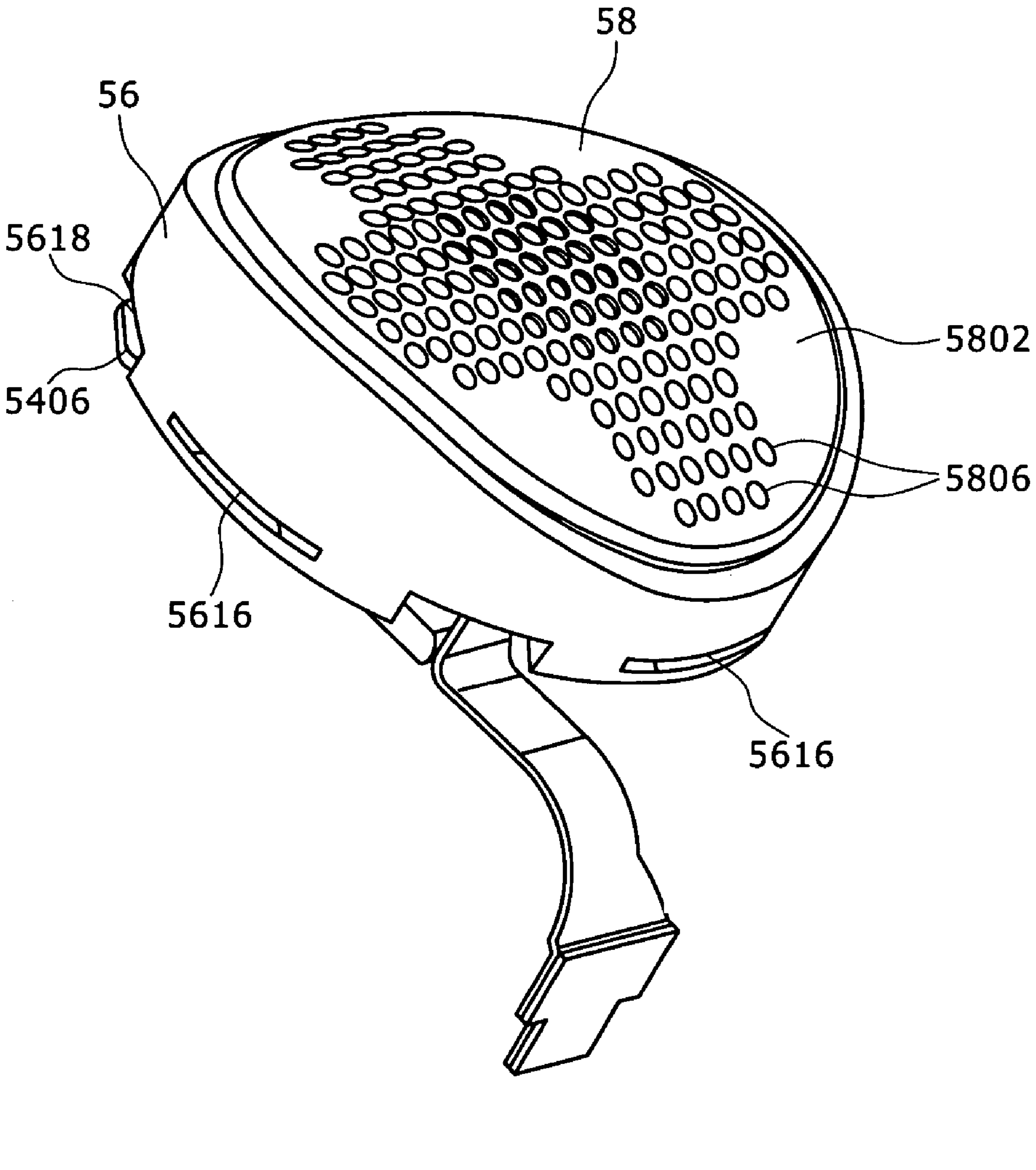
FIG. 16 is a perspective view of the microphone unit.

FIG. 10 is a plan view of the microphone unit, FIG. 11 is a view in the direction of the arrow B of FIG. 10, FIG. 12 is a view in the direction of the arrow C of FIG. 10, FIG. 13 is a view in the direction of the arrow D of FIG. 10, FIG. 14 is a view in the direction of the arrow E of FIG. 10, FIG. 15 is a view in the direction of the arrow F of FIG. 12, and FIG. 16 is a perspective view of the microphone unit.

The image pickup apparatus 100 of the present embodiment is a digital video camera as shown in FIG. 1. It has an enclosure 11 constituting its outer case and the enclosure 11 has a thickness in the longitudinal (front-to-rear) direction, a width in the lateral (left-to-right) direction, and a height in the vertical (top-to-bottom) direction.

In front of the enclosure 11, there is incorporated a lens mount 10 holding a photographing optical system 14 and, in the lens mount 10, there is disposed an objective lens 1402 so as to face forward.

Hereinafter, the side of the enclosure 11 toward the photographic subject along the optical axis of the objective lens 1402 is defined as the front side and the side opposite thereto is defined as the rear side. Further, the left and right sides of the enclosure 11 refer to those when the enclosure 11 is seen from its front side.

At the rear of the lens mount 10, there is disposed an imaging device 18 (FIG. 2) formed of a CCD or CMOS sensor for picking up a subject image guided thereto through the photographing optical system 14.

At an upper portion of the rear face of the enclosure 11, there is provided a view finder 20 for visually recognizing a subject image picked up by the imaging device 18.

In the upper face toward the front end of the enclosure 11, there is incorporated a microphone unit 50.

On the right-hand side face of the enclosure 11, there is provided a rectangular plate-shaped display 110, attached to the enclosure 11 via a hinge mechanism for opening and closing, for displaying an image picked up by the imaging device 18 or a moving picture, still picture, character, symbol, and the like reproduced from a storage medium 116.

On the left-hand side face of the enclosure 11, there is provided a recording and reproducing mechanism for detachably holding a storage medium 116 (FIG. 2) formed of an optical disk.

A recording and reproducing mechanism 130 is adapted to record a video signal picked up by the imaging device 18 and an audio signal captured by four microphones 52 (FIG. 2) provided in the microphone unit 50 on the storage medium 116 and also to reproduce a video signal and an audio signal recorded on the storage medium 116.

At positions of the upper face toward the rear end and at positions of both left- and right-hand faces toward the rear end of the enclosure 11, there are disposed a variety of operating switches 108, such as a zooming switch for allowing the photographing optical system 14 to make a zooming operation, operating buttons for making various operations, and photographing starting/stopping buttons.

The image pickup apparatus 100, as shown in FIG. 2, includes a picture processor 120 for generating picture data by performing predetermined data processing on an image pickup signal output from the imaging device 18 and recording the picture data on the storage medium 116 through the recording and reproducing mechanism 130, a display processor 122 for allowing the picture data to be displayed on the display 110, an audio signal processor 132 for generating an audio signal of a 5.1-channel stereophonic reproduction system by performing predetermined computing processing on an audio signal for four channels output from the four microphones 52 and recording the 5.1-channel audio signal on the storage medium 116 through the recording and reproducing mechanism 130, a controller 124, and the like.

The controller 124 is adapted to control the picture processor 120, display processor 122, recording and reproducing mechanism 130, audio signal processor 132, and the like.

Now, description will be given of the three-dimensional sound field reproduction system.

At present, as three-dimensional sound field reproduction systems that reproduce sound fields in the left and right directions and sound fields in the front and rear directions (hereinafter, referred to as three-dimensional sound fields), there are well-known such reproduction systems as DOLBY SURROUND system, DOLBY SURROUND PRO LOGIC system, DOLBY DIGITAL system, and DTS (Digital Theater Systems).

By reproducing a storage medium, on which an audio signal generated in accordance with such a three-dimensional sound field reproduction system, by the use of a reproduction apparatus applied with the three-dimensional sound field reproduction system, listeners can enjoy the realism of a live performance.

In order to record an audio signal corresponding to the above described three-dimensional sound field reproduction system, it is needed to collect sounds from three or more directions with use of separate microphones.

In the present embodiment, it is adapted such that sounds are picked up with use of four microphones in accordance with the 5.1 channel system as one of the above mentioned three-dimensional sound field reproduction systems.

It should be noted here that DOLBY, DOLBY SURROUND, DOLBY SURROUND PRO LOGIC, and DOLBY DIGITAL are registered trade names of Dolby Laboratories Licensing Corporation, US, and DTS is a registered trade name of Digital Theater Systems Inc., US.

Below will be described the microphone unit 50.

As shown in FIG. 1 and FIG. 8, the microphone unit 50 is made up of a receiving recess 1102 provided at the front of the upper face of the enclosure 11 for disposing the microphones 52 therein, a holding member 56 supported in the receiving recess 1102 by a supporting piece 54, the microphones 52 held by the holding member 56, a grill 58 for covering the upper face 5602 of the holding member 56, and the like.

More particularly, the receiving recess 1102 is made up of a bottom wall 1104 disposed on the enclosure 11 and a side wall 1106 uprising from the circumference of the bottom wall 1104, thereby forming the receiving recess as opened upward.

In the present embodiment, as shown in FIG. 1 and FIG. 3, the enclosure 11 is formed of an enclosure body 11A and a split member 11B integrally attached to the front portion of the upper face of the enclosure body 11A, while the receiving recess 1102 is formed on the split member 11B.

The holding member 56 is formed of a vibration relaxation material for relaxing vibrations.

As the vibration relaxation material, an elastic material such as elastomer and rubber, for example, can be used.

As shown in FIG. 4 and FIG. 8, the holding member 56 is formed into a circular disk shape and its periphery is provided with a cylindrical face with a diameter that allows the periphery to resiliently contact with the side wall 1106 of the receiving recess 1102.

In a condition of the holding member 56 having its periphery in resilient contact with the receiving recess 1102 and thereby being held inside the receiving recess 1102, the holding member 56 has its upper face 5602 facing upward and its lower face 5604 facing the bottom wall 1104 of the receiving recess 1102, with a space S secured between the lower face 5604 of the holding member 56 and the bottom wall 1104 of the receiving recess 1102.

Further, in the condition of the holding member 56 being received inside the receiving recess 1102, the upper face 5602 of the holding member 56 is formed into a cylindrical surface whose imaginary cylindrical axis is parallel to the optical axis of the objective lens 1402.

Further, on the upper face 5602 of the holding member 56, there are formed recesses for microphone 5606 as opened upward (in the case of the present embodiment, the recesses 5606 are provided by through holes for the microphones which pass through the holding member 56 in its thickness direction).

There are provided four recesses for microphone 5606 at the circumferential portion of the holding member 56 as disposed at even intervals in the circumferential direction.

In the condition of the holding member 56 being received in the receiving recess 1102 via supporting pieces 54, the recesses for microphone 5606 are each disposed in the front and rear, and the left and right, positions of the holding member 56.

Further, the recesses for microphone 5606 are formed to have such a depth, and the like, that the microphones 52 retained therein are just placed on a cylindrical surface whose imaginary cylindrical axis is parallel to the optical axis of the objective lens 1402.

Further, in the upper face 5602 of the holding member 56, there is cut a groove 5608 for inserting the grill therein along the circumferential edge of the holding member 56, continuously surrounding the entire circumference.

Further, there is formed a spring insertion hole 5610, penetrating from the upper face 5602 to the lower face 5604, at a position off the center of the holding member 56. In the present embodiment, as shown in FIG. 6B, the spring insertion hole 5610 has a large-bore portion 5610A located toward the side of the upper face 5602 and a small-bore portion 5610B located toward the side of the lower face 5604.

As shown in FIG. 4, FIG. 5, and FIG. 8, the holding member 56 has a recessed portion 5612 formed on its lower face, which is circular and concaved upward. In the circumferential wall 5614 of the recessed portion 5612, there are cut four engagement slits 5616 at even intervals.

At mutually opposing positions of the circumferential wall 5614, there are formed cuttings 5618 as opened downward.

As shown in FIG. 8, the supporting piece 54, which is formed of a thin plate having conductivity such as, for example, a metallic material, serves to support the holding member 56 within the receiving recess 1102.

As shown in FIG. 4, the supporting piece 54 has a main body portion 5402 in an rectangular shape, which is attached to the bottom wall 1104 of the receiving recess 1102, four engagement claws 5404 projected from four corners of the main body portion 5402, and two positioning pieces 5406 projected from mutually opposing two positions of the main body portion 5402.

The four engagement claws 5404 and two positioning pieces 5406 are disposed as extended at different levels with respect to the main body portion 5402, in the thickness direction of the main body portion 5402, to support the holding member 56 within the receiving recess 1102 such that the space S is secured between the holding member 56 and the bottom wall 1104.

There is made a screw hole 5408 in the center of the main body portion 5402 as shown in FIG. 8, and there is made a positioning hole 5410 in each of the two positioning pieces 5406 as shown in FIG. 4.

As shown in FIG. 4, there are provided four microphones 52 each thereof being mounted on a flexible substrate 53.

As shown in FIG. 4 and FIG. 5B, the flexible substrate 53 has a belt-shaped first wiring portion 5302 with conductive patterns formed thereon for transmitting a sound detection signal output from each microphone 52 and a belt-shaped second wiring portion 5304 with an earth-connection pattern to be connected to the earth potential formed thereon.

As shown in FIG. 8, the four microphones 52 are each inserted into each of the recess for microphone 5606 and disposed in the front and rear positions, and the left and right positions, of the holding member 56 such that they are on a cylindrical surface whose imaginary cylindrical axis is parallel to the optical axis of the objective lens 1402.

As shown in FIG. 4 and FIG. 8, the grill 58 is formed of a conductive thin plate of a metallic material, for example, and has an upper face portion 5802 circular in its plan view and a ring-shaped side face portion 5804 bent downwardly from the circumference of the upper face portion 5802.

The upper face portion 5802 is formed into a cylindrical face of a size covering the upper face 5602 of the holding member 56, i.e., in agreement with the upper face 5602 of the holding member 56, and the side face portion 5804 is formed so as to be fitted into a grill-insertion groove 5608 made in the holding member 56.

In the upper face portion 5802, there are made a plurality of through holes 5806 at portions facing the microphones 52.

In the present embodiment, as shown in FIG. 4, there is interposed a nonwoven fabric 62 between the upper face portion 5802 of the grill 58 and the upper face 5602 of the holding member 56 for covering the recesses for microphone 5606. The nonwoven fabric 62 serves to prevent air from blowing into the microphones 52 through the holes for microphone 5606 thereby causing noises.

As shown in FIG. 4, a coil spring 60, formed of a conductive material, has a coil portion 6002 received within the large-bore portion 5610A and a shaft portion 6004 extended from the end of the coil portion 6002 along the center axis of the coil portion 6002 to be inserted into the small-bore portion 5610B.

Description about assembling of the electronic apparatus will be given below.

The microphones 52 are inserted into the recesses for microphone 5606 on the holding member 56 from the lower face 5604, with the flexible substrate 53 horizontally spread out under the lower face 5604 of the holding member 56.

Then, the coil spring 60 is inserted into the spring insertion hole 5610. More specifically, the coil portion 6002 of the coil spring 60 is inserted into the large-bore portion 5610A of the spring insertion hole 5610 and the shaft portion 6004 is inserted into the small-bore portion 5610B of the spring insertion hole 5610.

Then, the side face portion 5804 of the grill 58 is inserted into the grill insertion groove 5608, the nonwoven fabric 62 is attached onto the backside of the upper face portion 5802 of the grill 58, and the upper face portion 5802 of the grill 58 is mounted over the upper face 5602 of the holding member 56.

Then, the four engagement claws 5404 of the supporting piece 54 are inserted into the engagement slits 5616 made in the holding member 56 and the two positioning pieces 5406 are received within the cuttings 5618 made in the holding member 56. Thereby, the first and second wiring portions 5302, 5304 are horizontally extended over the supporting piece 54.

Then, the second wiring portion 5304—of the first and second wiring portions 5302, 5304 of the substrate 53—is folded back from the upper face of the main body portion 5402, at the edge of the main body portion 5402, to the lower face of the main body portion 5402. A portion of the second wiring portion 5304 thus brought beneath the center of the lower face of the main body portion 5402 is adhesively attached to the center of the lower face of the main body portion 5402. Thereby, the earth-connection pattern portion of the second wiring portion 5304 of the flexible substrate 53 is electrically connected to the main body portion 5402 of the supporting piece 54. The first wiring portion 5302 is connected to the audio signal processor 132 shown in FIG. 2 through connectors and wiring cables, which are not shown.

Then, while the holding member 56, having the microphones 52, grill 58, and the nonwoven fabric 62 mounted thereon, is placed into the receiving recess 1102, end portions of the first and second wiring portions 5302, 5304 of the flexible substrate 53 are passed through a slit 1108 made in the bottom wall 1104 to be brought into the inside of the enclosure 11 as shown in FIG. 3, and FIG. 9-FIG. 16. A space S produced between the slit 1108 and the flexible substrate 53 is sealed up with a sound deadening sheet stuck thereto.

Then, the main body portion 5402 of the supporting piece 54 is attached onto the bottom wall 1104 of the receiving recess 1102. By having the main body portion 5402 of the supporting piece 54 attached onto the bottom wall 1104 of the receiving recess 1102, positioning pins 1110 projecting from the bottom wall 1104 are inserted into their respective two positioning holes 5410, made in the positioning pieces 5406 so that positioning of the holding member 56 in the receiving recess 1102 is performed.

Then a screw 1114 is passed through a screw insertion hole 1112 made in a portion of the split member 11B constituting the bottom portion of the receiving recess 1102 and screwed into the screw hole 5408 made in the supporting piece 54.

Thereby, the holding member 56 is supported within the receiving recess 1102 with a space S secured between its lower face 5604 and the bottom wall 1104.

Meanwhile, the coil spring 60 is compressed between the supporting piece 54 and the grill 58 so that the supporting piece 54 and the grill 58 are electrically connected through the coil spring 60.

In the present embodiment, as shown in FIG. 8, an earthing plate 70 connected with the earth potential is fixed to a portion of the lower face of the split member 11B constituting the bottom wall 1104 of the receiving recess 1102. A portion of the second wiring portion 5304, together with the earthing plate 70, is fixed to the lower face of the split member 11B by the screw 1114. Thereby, the earth-connection pattern on the second wiring portion 5304 and the earthing plate 70 are electrically connected and, hence, the earthing plate 70 is electrically connected with the supporting piece 54 through the earth-connection pattern on the second wiring portion 5304.

More specifically, the earthing plate 70 is electrically connected with the supporting piece 54 through the earth-connection pattern on the second wiring portion 5304, and the supporting piece 54 in turn is electrically connected with grill 58 through the coil spring 60. Thus, the supporting piece 54 and the grill 58 are securely connected with the earth potential and thus an advantage can be obtained that the microphone 52 is prevented from being affected by noises.

According to the present embodiment, the receiving recess 1102 is formed on the enclosure 11 as opened outward, the microphones 52 are held by holding member 56 made of a vibration relaxation material, and the holding member 56 is supported in the receiving recess 1102 by the supporting piece 54, such that a space S is secured between the holding member 56 and the bottom wall 1104 of the receiving recess 1102.

Accordingly, noises generated within the enclosure 11 are relaxed by virtue of the presence of the bottom wall 1104 and side wall 1106 constituting the receiving recess 1102, the space S, and the holding member 56. Therefore, noises reaching the microphones 52 are suppressed and a good audio signal can be advantageously obtained.

Further, since there is provided the space S between the holding member 56 and the bottom wall 1104, the vibration generated within the enclosure 11 is prevented from being directly transmitted from the bottom wall 1104 to the holding member 56, or even if the vibration is transmitted from the bottom wall 1104 to the supporting piece 54, it is relaxed by the holding member 56. Therefore, vibrations reaching the microphones 52 can be suppressed and thus an advantage is provided in obtaining a good audio signal.

Accordingly, in performing an effective collection of weak sounds to help generate an audio signal of a plurality of channels in a three-dimensional sound field reproduction system such as the 5.1 channel system, adverse effects of the noises and vibrations can be greatly suppressed. Therefore, the quality of the audio signal of the three-dimensional sound field reproduction system recorded on the storage medium 116 can be improved and, when the storage medium 116 is reproduced by an audio apparatus (reproducing apparatus) of the three-dimensional sound field reproduction system, a great advantage can be obtained that the listeners may enjoy the realism of a live performance.

Further, in the present embodiment, the microphones 52 are disposed on a cylindrical surface whose imaginary cylindrical axis is parallel to the optical axis of the objective lens 1402 and placed in the front and rear positions and the left and right positions of the holding member 56. When the four microphones 52 are thus disposed on such a cylindrical surface, the ambient sound can be collected with better balancing than when the four microphones 52 are disposed on a planar face and this specifically provides a merit of improving characteristics of audio signals of the 5.1 channel system.

Although the case where an audio signal of the 5.1 channel system with the use of four microphones 52 is recorded on the storage medium 116 has been described in the present embodiment, the microphones may be one in number or of any number more than that and no limit is placed on the type of the signal recorded on the storage medium 116.

Although the present embodiment has been described as related to a case where the invention is applied to a digital video camera, there is no such limitation in the application of the present invention. As a matter of course, it can be applied, for example, to image pickup apparatus such as digital still cameras, camera-equipped mobile telephones, sound recorders other than image-pickup apparatuses, and apparatuses incorporating such recorders.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus equipped with a microphone comprising:

an enclosure constituting an outer case of said electronic apparatus;

a receiving recess formed in the enclosure, the receiving recess including a bottom wall and a side wall uprising from a circumference of the bottom wall;

a holding member received in said receiving recess, said holding member being formed of a vibration relaxing material;

a supporting piece for supporting said holding member within said receiving recess such that a space is secured between said holding member and said bottom wall;

a plurality of microphone recesses formed on an outward face of said holding member, said outward face being curved around an cylindrical axis that is parallel to an optical axis of said electronic apparatus;

a microphone inserted into each of said microphone recesses; and a grill disposed to cover said outward face of said holding member.

2. The electronic apparatus according to claim 1, wherein a circumferential portion of said holding member is fit into the side wall of said receiving recess.

3. The electronic apparatus according to claim 1, wherein said microphone recesses are disposed apart from each other such that four of said microphones are disposed at front, rear, left, and right positions around the holding member, respectively.

4. The electronic apparatus according to claim 1, wherein said enclosure includes an enclosure main body and a split member integrally attached to said enclosure main body, and said receiving recess is provided within said split member.

5. The electronic apparatus according to claim 1, wherein said electronic apparatus is an image pickup apparatus, the optical axis of said image pickup apparatus extends in front and rear directions in which the front is defined as a side toward a photographic subject, a plurality of said microphone recesses are disposed at a circumferential portion of said holding member and spaced apart from each other in the circumferential direction, and said plurality of microphones are disposed on the outward face around the cylindrical axis parallel to said optical axis, by virtue of the disposition of said microphone recesses.

6. The electronic apparatus according to claim 1, wherein said electronic apparatus is an image pickup apparatus, the optical axis of said image pickup apparatus extends in front and rear directions in which the front is defined as a side toward a photographic subject, four of said microphone recesses are disposed in front, rears, left, and right positions of said holding member, respectively, and four microphones are disposed in said four microphone recesses in the outward face of said holding member, around the cylindrical axis parallel to said optical axis.

7. The electronic apparatus according to claim 6, wherein said grill is disposed on a cylindrical surface around the cylindrical axis parallel to said optical axis.

8. The electronic apparatus according to claim 1, wherein said electronic apparatus is an image pickup apparatus, the optical axis of said image pickup apparatus extends in front and rear directions in which the front is defined as a side toward a photographic subject, and said grill is disposed on a cylindrical surface around the cylindrical axis parallel to said optical axis.

9. The electronic apparatus according to claim 1, wherein:

said supporting piece and said grill are each made of a conductive material, and a coil spring made of a conductive material is disposed within a hole passing through said holding member, and said coil spring is compressed between said supporting piece and said grill.

* * * * *

UNITED STATES PATENT AND TRADEMARK OFFICE

CERTIFICATE OF CORRECTION

PATENT NO. : 7,616,260 B2
APPLICATION NO. : 11/248126
DATED : November 10, 2009
INVENTOR(S) : Shinichi Kano et al.

It is certified that error appears in the above-identified patent and that said Letters Patent is hereby corrected as shown below:

*In claim 1, column 9, line 38, "an cylindrical" should read --a cylindrical--.

In claim 6, column 10, line 24, "rears," should read --rear,--.

Signed and Sealed this

Ninth Day of February, 2010

David J. Kappos
*Director of the United States Patent and Trademark Office*